(12) United States Patent
Hathaway et al.

(10) Patent No.: US 11,465,924 B2
(45) Date of Patent: Oct. 11, 2022

(54) HYBRID PROCESS AND SYSTEM FOR RECOVERING WATER

(71) Applicant: SUNVAPOR, INC., Pasadena, CA (US)

(72) Inventors: Brandon Hathaway, Pasadena, CA (US); Philip Gleckman, Claremont, CA (US)

(73) Assignee: SUNVAPOR, INC., Pasadena, CA (US)

( * ) Notice: Subject to any disclaimer, the term of this patent is extended or adjusted under 35 U.S.C. 154(b) by 0 days.

(21) Appl. No.: 17/553,650

(22) Filed: Dec. 16, 2021

(65) Prior Publication Data

US 2022/0153621 A1  May 19, 2022

Related U.S. Application Data

(63) Continuation of application No. PCT/US2021/041674, filed on Jul. 14, 2021.

(60) Provisional application No. 63/051,886, filed on Jul. 14, 2020.

(51) Int. Cl.
| | | |
|---|---|---|
| *C02F 9/00* | (2006.01) | |
| *C02F 1/14* | (2006.01) | |
| *C02F 1/16* | (2006.01) | |
| *C02F 1/44* | (2006.01) | |
| *C02F 103/08* | (2006.01) | |

(52) U.S. Cl.
CPC .......... *C02F 9/00* (2013.01); *C02F 1/14* (2013.01); *C02F 1/16* (2013.01); *C02F 1/445* (2013.01); *C02F 1/447* (2013.01); *C02F 2103/08* (2013.01); *C02F 2201/46155* (2013.01)

(58) Field of Classification Search
USPC .............................. 203/10; 210/713
See application file for complete search history.

(56) References Cited

U.S. PATENT DOCUMENTS

| | | | |
|---|---|---|---|
| 9,487,424 B2* | 11/2016 | Jacobs | C02F 1/281 |
| 10,259,735 B1* | 4/2019 | Bader | C02F 1/06 |
| 10,752,523 B2* | 8/2020 | Bower | C02F 1/447 |
| 10,940,439 B1* | 3/2021 | Ahmed | B01D 61/58 |
| 2010/0163471 A1* | 7/2010 | Elyanow | B01D 61/04 |
| | | | 210/260 |

(Continued)

FOREIGN PATENT DOCUMENTS

| | | |
|---|---|---|
| WO | WO 2014/014889 | 1/2014 |
| WO | WO 2019/236340 | 12/2019 |
| WO | WO 2022/015879 | 1/2022 |

OTHER PUBLICATIONS

International Search Report and Written Opinion in PCT Application PCT/US21/41674 dated Oct. 26, 2021 in 15 pages.

*Primary Examiner* — Nina Bhat
(74) *Attorney, Agent, or Firm* — Knobbe, Martens, Olson & Bear, LLP

(57) ABSTRACT

A hybrid process and system for separating water from an inlet brine solution is disclosed. The hybrid process couples at least two different separation processes/systems. The inlet brine solution is fed into a first separation process, which produces a water distillate and a brine concentrate. The brine concentrate from the first separation process is then fed into the second separation process to further recover additional water. The excess heat from the second separation process is supplied to the first separation process.

19 Claims, 6 Drawing Sheets

(56) References Cited

U.S. PATENT DOCUMENTS

| | | | |
|---|---|---|---|
| 2012/0273417 A1* | 11/2012 | McGinnis | B01D 61/002 |
| | | | 210/637 |
| 2015/0175442 A1 | 6/2015 | Dahdah et al. | |
| 2015/0225261 A1 | 8/2015 | McGinnis | |
| 2016/0002073 A1* | 1/2016 | Nowosielski-Slepowron | ............ |
| | | | B01D 61/58 |
| | | | 202/176 |
| 2017/0217789 A1* | 8/2017 | Beitelmal | B01D 3/42 |
| 2017/0326499 A1* | 11/2017 | Iyer | C02F 1/445 |
| 2017/0369337 A1* | 12/2017 | Goodman | C02F 1/445 |
| 2018/0028977 A1* | 2/2018 | Ghaffour | B01D 61/58 |
| 2019/0194043 A1* | 6/2019 | Mtombeni | C02F 1/5245 |
| 2020/0148558 A1* | 5/2020 | Ghaffour | B01D 61/364 |

\* cited by examiner

HYBRID PROCESS AND SYSTEM FOR RECOVERING WATER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present disclosure is related to a process for recovering water from brine, and a system for performing such a process.

Description of the Related Art

Brackish water is an enormous untapped resource for semiarid states in critical need of low-salinity water. Reverse Osmosis (RO) is an energy efficient technology that can recover about 50% of the water but produces brine waste as a by-product. Brine discharge to surface waters has a detrimental impact on the environment and is regulated. The use of evaporation ponds is limited by the high cost of land required and the potential for environmental damage due to leakage that increases with the quantity of disposed brine. Therefore, government agencies such as the U.S. Bureau of Reclamation have sought methods from industry to significantly reduce the volume of brine waste to bring the footprint of evaporation ponds to levels that are economically and environmentally acceptable. The conventional method of high-water recovery is based on mechanical vapor compression (MVR). MVR has been deployed to treat wastewater from power plants that must comply with environmental regulations. However, MVR has serious drawbacks: (1) high electricity consumption, (2) high capital costs, and (3) it relies on baseload electricity generated from fossil fuel. A renewable energy-based process that is otherwise similar is use of solar steam to drive only thermal vapor recompression (TVR), however it suffers from (1) high thermal energy consumption and (2) high capital costs.

SUMMARY OF THE INVENTION

Provided herein is a hybrid process for separating water from an inlet brine solution comprising feeding the inlet brine solution into a first separation process thereby producing a first water distillate and a first concentrated brine solution, feeding the first concentrated brine solution into a second separation process thereby producing a second water distillate and a second concentrated brine solution, and wherein the first separation process occurs at a lower temperature than the second separation process, and heat removed from the second separation process is provided to the first separation process.

In some embodiments, the hybrid process for separating water from an inlet brine solution further comprising a thermal energy source that provides a high temperature heat for the second separation process. In some embodiments, the thermal energy source is solar thermal energy, geothermal energy, nuclear energy, exothermic chemical reaction, or a combination thereof.

In some embodiments, the hybrid process further comprising collecting the first water distillate and the second water distillate.

In come embodiments, the second concentrated brine solution has a higher concentration than the first concentrated brine solution, and the first concentrated brine solution has a higher concentration than the inlet brine solution.

In some embodiments, the first separation process comprises a process selected from the group consisting of membrane distillation, forward osmosis desalination, enhanced-multi effect thermal separation, and humidification-dehumidification.

In some embodiments, the first separation process comprises the membrane distillation. In some embodiments, feeding the inlet brine solution into a first separation process comprises feeding the inlet brine solution into a first circulating brine stream, heating the first circulation brine stream using the heat removed from the second separation process, and passing the first circulating brine stream through a hot side of the membrane distillation after the heating step.

In some embodiments, feeding the inlet brine solution into a first separation process further comprising passing the first circulating brine stream through a cool side of the membrane distillation.

In some embodiments, feeding the inlet brine solution into a first separation process further comprising passing the first water distillate through a cool side of the membrane distillation.

In some embodiments, the second separation process comprises a process selected from the group consisting of vertical falling film evaporation, forced circulation crystallization, multiple effect distillation, and multistage flash.

In some embodiments, the second separation process comprises the vertical falling film evaporation. In some embodiments, feeding the first concentrated brine solution into the second separation process comprises feeding the first concentrated brine solution into a second circulating brine stream, and heating the second circulation brine stream.

In some embodiments, the heat removed from the second separation process comprises water vapor.

In some embodiments, the hybrid process further comprises feeding the second concentrated brine solution to a third separation process, thereby producing a third water distillate and a filtrate waste.

In some embodiments, the third separation process is a forced convection crystallizer.

In some embodiments, the third separation process occurs at a higher temperature than the temperature of the first separation process.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION OF THE PREFERRED EMBODIMENT

The disclosed technology relates to the system and process for recovering water from brine solution, and further reducing the volume of discharged brine. The efficient use of the heat removed from the processes also further reduces the thermal energy consumption for an industrial desalination process. The disclosed process overcomes the disadvantages of conventional high recovery processes like MVR as well as those of non-hybridized renewable processes like TVR.

Provided herein is a system and process for recovering water and concentrating an inlet brine, including brackish water, sea water, or brine produced from a variety of sources such as reverse osmosis waste, cooling tower blowdown, or brine reservoirs for carbon sequestration with a feedwater total dissolved solids (TDS) of >3%. The hybrid system comprises a high temperature separation system coupled to a low temperature separation system, wherein the heat removed from the high temperature system is sent to the low temperature separation system as a low-grade heat source, and the withdrawn brine concentrate from the low temperature system is sent to the high temperature separation system for further removal of water. As a result, further concentration of the brine solution occurs in the high temperature separation system, which further reduces the volume of the brine discharge. As a hybrid system/process, the high temperature separation system and the low temperature separation system are not the same. For example, the two separation systems involve different types of separation processes for removing water from the brine solution.

In some embodiments, the low-grade heat produced from the high temperature separation system is used to heat the circulating brine solution in the low temperature separation system. In other embodiments, the low-grade heat from the high temperature separation system is used to heat the circulating draw solution to recover water.

Figure 1:
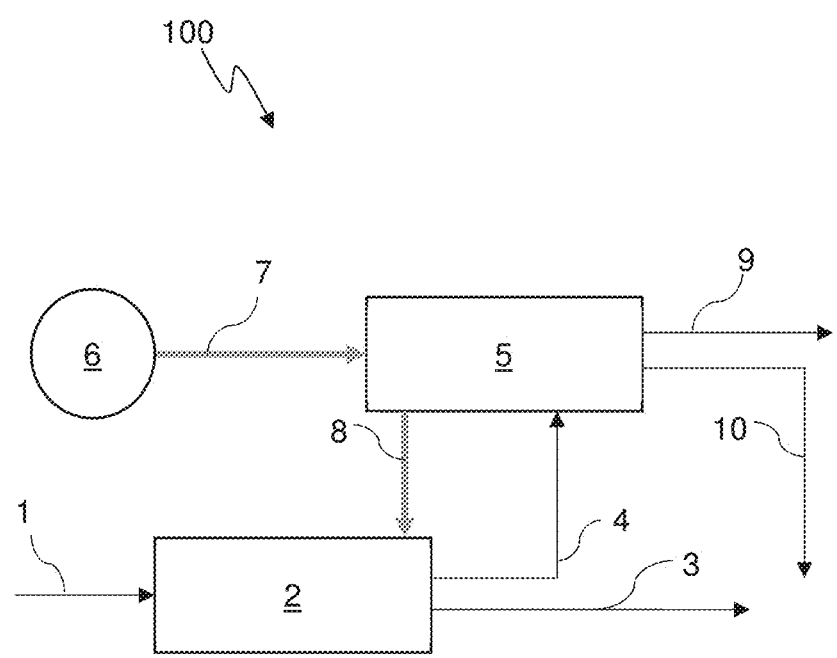
FIG. 1 is a process flow diagram of a process/system for recovering water from brine solution.

With reference to FIG. 1, a hybrid process 100 for separating water from an inlet brine solution includes feeding the inlet brine solution 1 into a first separation process 2 thereby producing a first water distillate 3 and a first concentrated brine solution 4; feeding the first concentrated brine 4 solution into a second separation process 5 thereby producing a second water distillate 10 and a second concentrated brine solution 9; and wherein the first separation process occurs at a lower temperature than the second separation process; and heat removed 8 from the second separation process is provided to the first separation process 2.

In some embodiments, the first separation process 2 is a low temperature process with a top brine temperature in the range of between about 40° C. and about 86° C., between about 40° C. and about 75° C., or between about 60° C. and about 86° C. In some embodiments, the second separation process 5 is a high temperature process with a top brine temperature in the range of between about 86° C. and about 110° C., between about 86° C. and about 95° C., and between about 90° C. and about 110° C. A high temperature heat 7 is provided to the second separation process 5, while a low temperature heat 8 is provided to the first separation process 2. In some embodiments, the hybrid process 100 further comprising a thermal energy source 6 that provides a high temperature heat 7 to the second separation process 5.

In some embodiments, the hybrid process 100 further include a thermal energy source 6 that provides a high temperature heat 7 for the second separation process 5. Some non-limiting examples of the thermal energy source 6 include solar thermal energy, geothermal energy, nuclear energy, or exothermic chemical reaction. Preferably, the thermal energy source 6 is a renewable energy source. In some embodiments, the thermal energy source 6 is solar thermal energy. A relatively high capacity factor (>30%) source of low-cost renewable steam can be used to evaporate water from the brine. In some embodiments, the steam discharged from a steam accumulator that has stored thermal energy collected from a field of solar collectors may be a source. The steam, which is saturated and at a pressure in the range about 30 to about 150 psig, and preferentially at a pressure of 100 psig, supplies the motive steam in a second separation process for a thermocompressor that takes the place of the mechanical compressor used in MVR. In each case, compression recycles the latent heat of vapors produced, for example, in the falling film evaporator, thereby increasing the gained output ratio (GOR, i.e., mass of distillate per mass of steam consumed).

In some embodiments, the hybrid process 100 further comprising collecting the first water distillate and the second water distillate. For example, the water distillate may be delivered to a distillate tank 11. The water distillate in the distillate tank 11 may be withdrawn for use as needed. In some embodiments, the water distillate may be used as the liquid feed water for steam generation or for use within the steam cycle for heating purposes.

The hybrid process 100 involves two different types of separation processes to efficiently achieve the removal of water from a brine stream. In some embodiments, the second concentrated brine solution has a higher concentration than the first concentrated brine solution, and the first concentrated brine solution has a higher concentration than the inlet brine solution. In some embodiments, the second concentrated brine solution 9 may be a saturated brine solution, for example, about 25% to about 30% total dissolved solid by weight. In some embodiments, the saturated brine solution is disposed in an evaporation pond. In some embodiments, the second concentrated brine solution 9 may not be a saturated brine solution. In some embodiments, the second concentrated brine solution 9, whether saturated or not, can be fed into a third separation system/process for further reducing the volume of the brine waste and recovering additional water. In some embodiments, zero liquid discharge or minimum liquid discharge may be achieved by adding the third separation process to the system.

Figure 2:
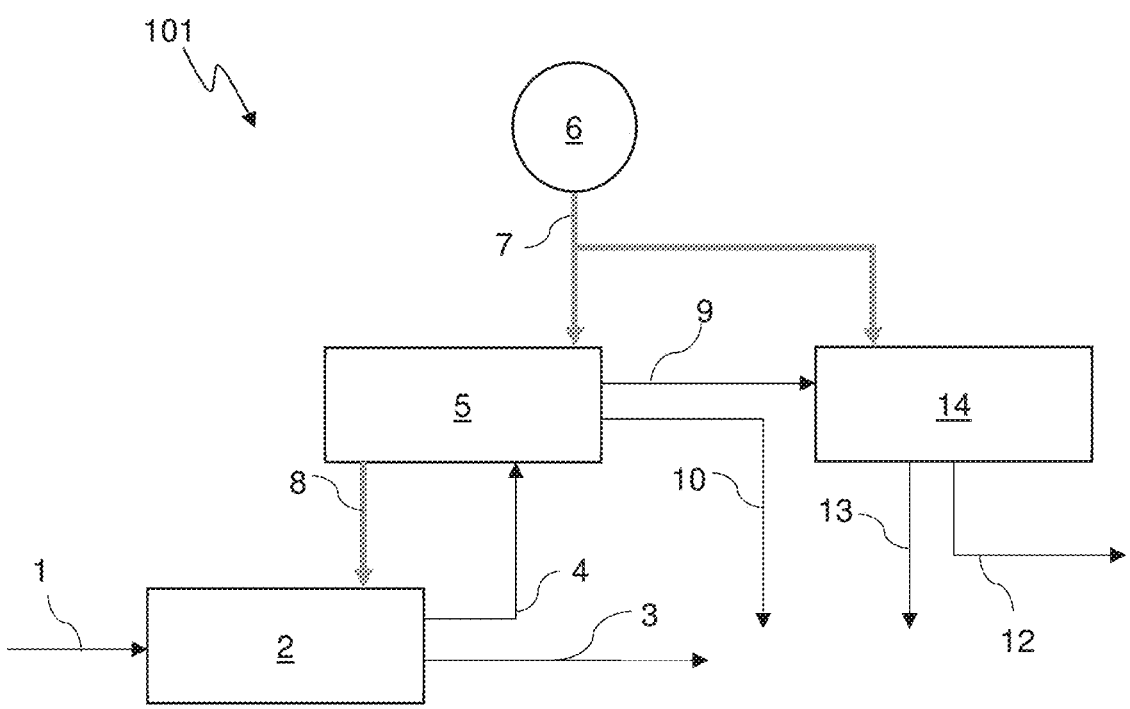
FIG. 2 is a process flow diagram of another process/system for recovering water from brine solution.

In some embodiments, a third separation process 14 may be coupled to the second separation process 5 as depicted in the process diagram of FIG. 2. A hybrid process 101 for separating water from an inlet brine solution includes (1) feeding the inlet brine solution 1 into a first separation process 2 thereby producing a first water distillate 3 and a first concentrated brine solution 4, (2) feeding the first concentrated brine 4 solution into a second separation process 5 thereby producing a second water distillate 10 and a second concentrated brine solution 9, and (3) feeding the second concentrated brine solution 9 into a third separation process 14 thereby producing a third water distillate 13 and a filtrate waste 12. The first separation process 2 occurs at a lower temperature than the second separation process 5; and heat removed from the second separation process 5 is provided to the first separation process 2. In some embodiment, a portion of the vapor liberated from the brine solution (i.e., heat) in the third separation process 14 may also be delivered to the first separation process 2 for heating purposes.

The third separation process may be a high temperature process with a top brine temperature in the range of between about 86° C. and about 110° C., between about 86° C. and about 95° C., and between about 90° C. and about 110° C. In some embodiments, the third separation process 14 can occur at the same temperature as the temperature of the second separation process 5. In other embodiments, the third separation process 14 can occur at a different temperature as the temperature of the second separation process 5.

The filtrate waste 12 may comprise solids, a slurry, saturated solution (e.g., a saturated brine solution), or a combination thereof. In some embodiments, the solid in the filtrate waste 12 may comprise salt crystals.

In some embodiments, the first separation process 2 may involve membrane distillation, forward osmosis desalination, enhanced-multi effect thermal separation, or humidification-dehumidification. In some embodiments, the second separation process 5 may involve vertical falling film evaporation, forced circulation crystallization, multiple effect distillation, or multistage flash.

Figure 3:
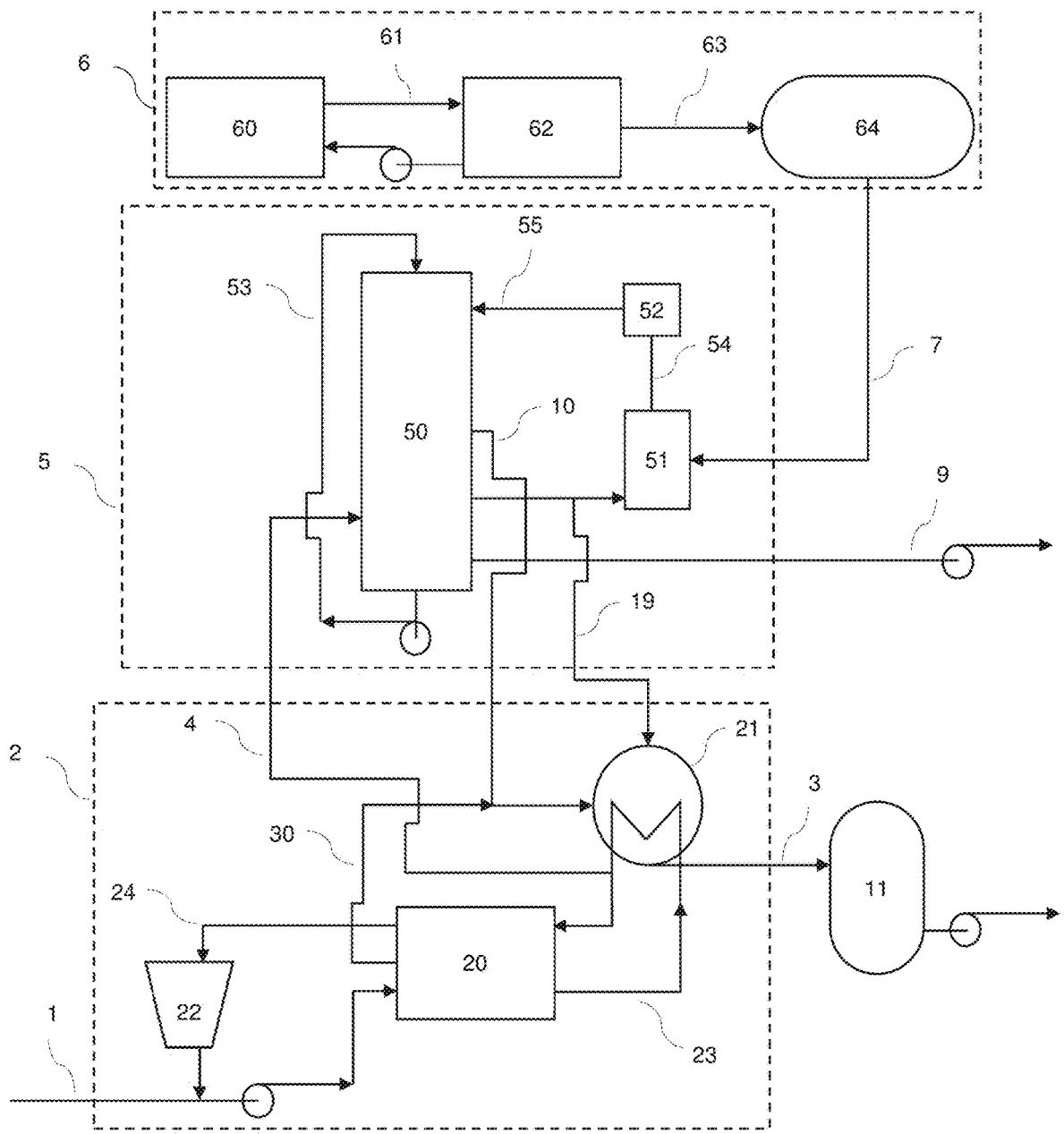
FIG. 3 is a process flow diagram of an embodiment of the process/system represented in FIG. 1.
Figure 4:
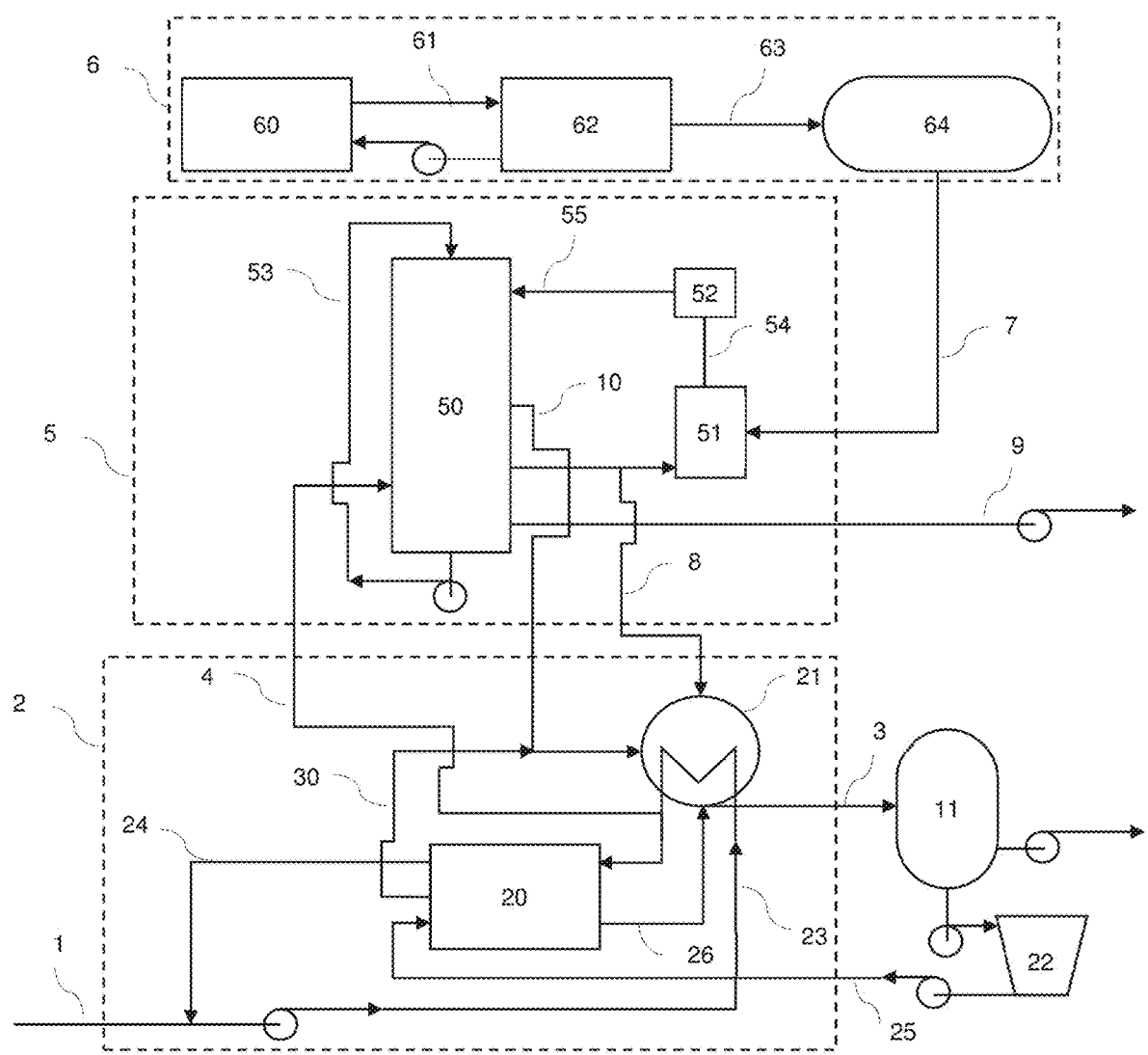
FIG. 4 is a process flow diagram of another embodiment of the process/system represented in FIG. 1.
Figure 5:
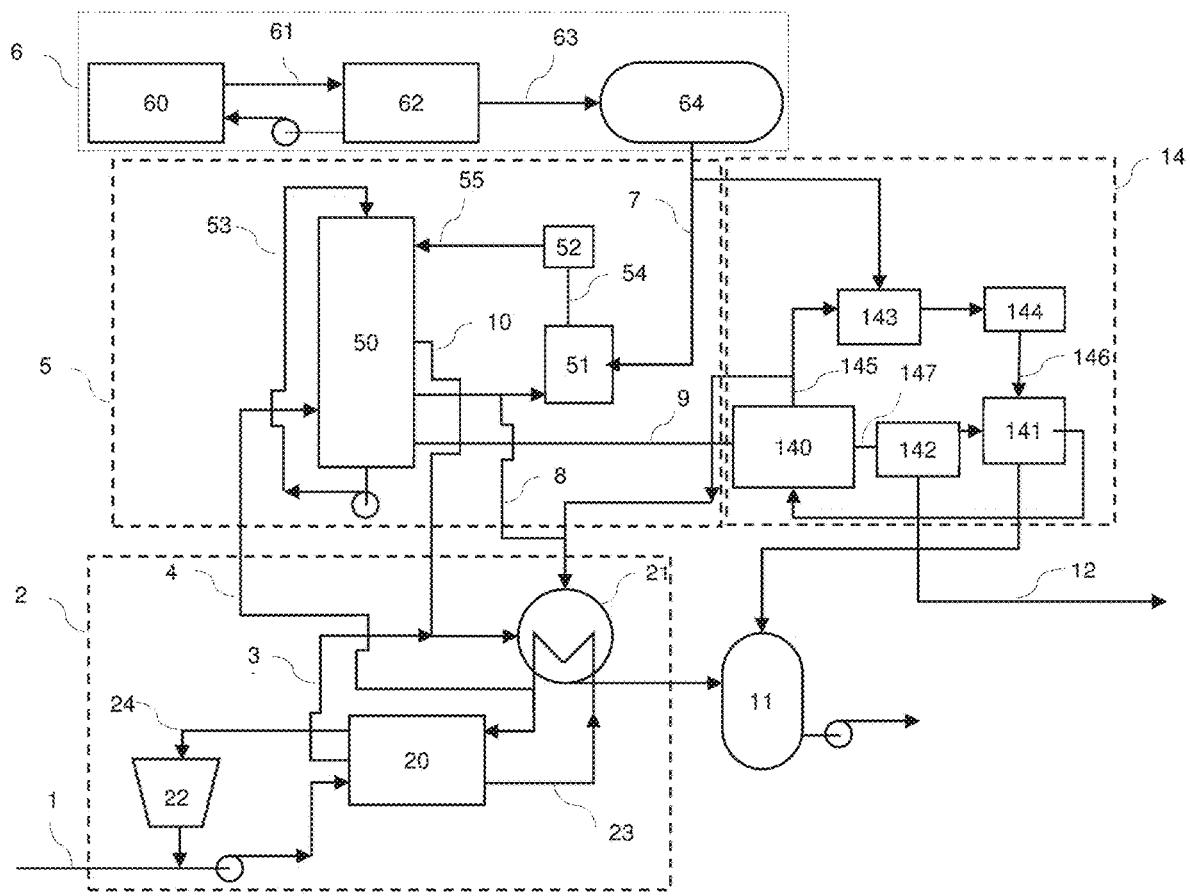
FIG. 5 is a process flow diagram of an embodiment of the process/system represented in FIG. 2.

In some embodiments, the hybrid process 100 or 101 may involve the membrane distillation as the first separation process 2 and the vertical falling film evaporation as the second separation process 5. Example process flow diagrams of various embodiments are shown in FIGS. 3 to 5. In some embodiments, feeding the inlet brine solution 1 into a first separation process 2 involves feeding the inlet brine solution 1 into a first circulating brine stream 23, heating the first circulation brine stream 23 using the heat removed 8 from the second separation process 5 (i.e., low temperature heat), and passing the first circulating brine stream 23, now heated, through the hot side of the membrane distillation module 20 after the heating step. The water in the first circulating brine solution 23 would be recovered as a permeate 30, and the remaining brine stream 30 is mixed with the inlet brine solution 1 and continue to circulate in the system.

The circulating brine stream 23 may be heated by passing through a condenser 7 with the heat removed 8 from the second separation process 5. The heat removed 8 from the second separation process 5 may be delivered to the condenser 7 as water vapor. In some embodiments, other heat exchanging liquid or means may be used to deliver the heat removed 8 from the second separation process 5 to the first separation process 2. In some embodiments, the permeate 30 (i.e., water vapor) from the membrane distillation module 20 may be delivered to the condenser 7 for additional heat. In some embodiments, water is condensed from the vapor delivered to the condenser 7 and recovered as the first water distillate 3. In some embodiments, a portion of the circulating brine stream 23 may be withdrawn as the first concentrated brine solution 4, for delivering to the second separation process 5.

In some embodiments, the first circulating brine stream 23 also passes through the cool side of the membrane distillation module 20 as shown in FIG. 3. In some embodiments, a cooling process 22 is employed to cool the remaining brine stream 30 that comes out of the hot side 24 before the inlet brine solution 1 is fed into the first circulating brine stream 23. The cooled circulating brine stream then passes through the cold side.

In some embodiments, the first circulating brine stream 23 does not pass through the cold side of the membrane distillation module 20. Instead, the water distillate in the distillate tank 11 is withdrawn for circulating through the cold side of the membrane distillation module 20 as shown in FIG. 4. In some embodiments, a cooling process 22 is employed to cool the water distillate prior to passing through the cold side of the membrane distillation module 20. The water distillate warms up as it passes through the membrane distillation module 20, and is directed to the condenser 7 before returning to the distillate tank 11.

In some embodiments, feeding the first concentrated brine solution 4 into the second separation process includes feeding the first concentrated brine solution into a second circulating brine stream, and heating the second circulation brine stream 53. A portion of the first circulating brine stream 23 is delivered to the vertical falling film evaporator 50 as the first concentrated brine solution 4. The first concentrated brine solution 4 is mixed in with the second circulating brine stream 53 and heated in the evaporator 60. Water is liberated from the second circulating brine stream 53 forming water vapor 8, while a second concentrated brine solution 9 is withdrawn from the evaporator module 50. The high temperature heat 7 is the prime energy input to the second separation process 5. The saturated steam 55 enters the evaporator 50 where it condenses on the exterior of the vertical tubes providing heat for the liberation of water vapor 8 from the circulating brine stream 53.

In some embodiments, the hybrid process 100 or 101 may involve the forward osmosis desalination as the first separation process 2 and the vertical falling film evaporation as the second separation process 5. The inlet brine solution 1 passes through the forward osmosis module on one side of the water-permeable membrane, while a draw solution passes through the other side of the membrane. The water in the inlet brine solution 1 is drawn across the membrane into the draw solution. The diluted draw solution exits the forward osmosis module and enters a draw solution recovery module. The low temperature heat 8 is used for providing heat to liberate water from the diluted draw solution, thereby recovering the draw solution for further circulation. The vertical falling film evaporation process is as described above.

In some embodiments, the third separation process 14 may involve forced convection crystallization as shown in FIG. 5. The second concentrated brine solution 9 that is fed into the third separation process 14 may or may not be a saturated brine solution. In some embodiments, the second concentrated brine solution 9 has a total dissolved solid concentration of about 10% to about 20% by weight.

In some embodiments, the second concentrated brine solution 9 is fed into the forced convection crystallizer module 140, wherein the water in the second concentrated brine solution 9 is liberated forming a vapor stream 145, any crystallized solids are removed from the brine stream 147 as it passes through the filtration process 142 on its way to the condensing heat exchanger 141 before returning to the forced convection crystallizer module 140. The vapor stream 145 is brought into a saturated steam and provides heat needed for liberation of vapor within the crystallizer module 140. In some embodiments, a portion of the vapor stream 145 may be delivered to the first separation process to provide additional low temperature heat.

The disclosure also provides a hybrid system for separating water from an inlet brine solution. The system includes a first separation system with an intake for receiving inlet brine solution, a low temperature heat intake, a first concentrated brine solution outlet, and a water distillate discharge outlet, a second separation system with a first concentrated brine solution inlet, a second concentrated brine solution outlet, an excess heat outlet, a water distillate outlet. The first concentrated brine solution outlet is in fluid communication with the first concentrated brine intake. The excess heat outlet is in fluid communication with the low temperature heat intake. The first separation system and the second separation system are different. In some embodiments, the hybrid system further included a third separation system with a high temperature heat intake, a filtrate waste outlet, and a third water distillate outlet. The detail parts of the system are apparent from the description of the hybrid process and the process flow diagrams.

The falling film evaporator alone does not achieve a sufficiently energy-efficient pathway to high brine volume reductions. The disclosed hybrid process/system is capable of achieving a significantly higher (~2.5×) efficiency for the same 10× brine volume reduction.

EXAMPLES

Example 1

As shown in FIG. 3, a solar thermal collector or array of collectors (60) delivering heat to a circulating working fluid (61) which may be liquid, gaseous, or mixed phases in some embodiments. The working fluid is delivered to a unit process for producing saturated steam or extracting thermal energy from the fluid (62) which may be a steam generator, heat exchanger, or vapor liquid separator in various embodiments. Saturated steam (63) is delivered to a steam accumulator or thermal storage device capable of producing steam (64). Saturated solar steam (7) is provided at pressures of 50-100 psig as the primary energy input to the second separation process (5), acting as the motive fluid for a thermocompressor (51). Superheated steam (54) is produced from the thermocompressor at a pressure, P14, which corresponds to a saturation temperature that exceeds the temperature T1 of circulating brine (53) within the evaporator (60). The superheated steam (54) is brought back to a saturated state at pressure P14 by means of a de-superheater (52). The resulting saturated steam (55) enters the evaporator (60) where it condenses on the exterior of vertical tubes, providing heat for the liberation of water vapor (8) from the recirculating brine (53). The pure water condensate (10) exits the evaporator (60) and joins the other condensate streams at the condenser (21). A stream of saturated brine (9) is continuously withdrawn from the evaporator for disposal in an evaporation pond at saturated concentrations of 25-30% TDS by weight.

The first separation process (2) is provided with process heat from the condensation of excess vapor (8) produced in the evaporator within the condenser (21). The condenser heats brine up to temperatures T2 appropriate for operating the hot-side of a thermal membrane distillation (MD) or forward osmosis (FO) process (20). The permeate from the membrane process (30) is connected to the condenser (21) which, in some embodiments, may provide vacuum pressures to encourage enhanced performance from the membrane process. The reject brine leaving the membrane process (24) passes through a cooling process (22) and is mixed with the incoming brine stream (1) before re-entering the membrane process (20) and providing the low temperatures needed for operation. After the membrane process (20) the moderate temperature brine stream (1) provides the cooling needed to condense vapor supplied to the condenser. All of the condensed distillate (3) is delivered to a distillate tank (11) where it is withdrawn for use as needed including in some embodiments the liquid feedwater for the solar steam generation or for the de-superheater (52).

Using the MD process, we are able to achieve the desired volume reduction (only 10% of the feed brine at 3% TDS is rejected as concentrated brine) with a corresponding recovery of at least 83% and a GOR of greater than 6.

Example 2

As shown in FIG. 4, a modified version of the process with all changes related to the first separation process (2), while the other units remain as described for FIG. 3. In this embodiment, the first brine stream (23) and incoming brine (1) only pass through the hot side of the membrane process (20) after receiving heat from the condenser (21). The cold side of the membrane process (20) is maintained by the use of a stream of distillate (25) which was passed through the cooling process (22) from the distillate tank (11). After exiting the membrane process (8), the warm distillate (26) joins the other distillate streams at the condenser (22). This configuration allows for the use of standard inexpensive metallurgical materials for the cooling process (9) which is no longer handling brine but only distillate.

Example 3

As shown in FIG. 5, a modified version of the process with all changes related to the second separation process (5) while other units remain as described for FIG. 3. Specifically, the brine stream leaving the evaporator (9) is no longer delivered to an evaporation pond, but is instead delivered to a forced convection crystallizer (FCC) (140) for final separation of water and solids. In this configuration, the brine leaving the evaporator (9) may not be at a saturated concentration, but an intermediate concentration in the range of 10-20% wt TDS. Within the crystallizer (140) a portion of the vapor released from the brine (33) is compressed within a thermocompressor (143) driven by solar steam (7) to a superheated state, and then brought back to saturation by a desuperheater (144) resulting in saturated steam (146) at a pressure P34 whose corresponding saturation temperature exceeds the crystallizer temperature T3. The condensation of this steam (146) in a shell and tube heat exchanger (141) provides the heat needed for liberation of vapor within the crystallizer (140) as well as a stream of condensate that returns to the condensate tank (11). Brine within the crystallizer is maintained at or above saturation concentrations of 25-30% wt TDS to allow the formation of solids which are removed from a flow of brine (147) which passes through a filtration process (142) on its way to the condensing heat exchanger (141) before returning to the crystallizer. The filtrate waste stream (12) which may consist of solids, a slurry, or a saturated solution in various embodiments is then disposed of outside of the process. The excess portion of the liberated vapors (145) are passed to the condenser (21) to provide additional heat input to the second stage water removal process.

Example 4

Figure 6:
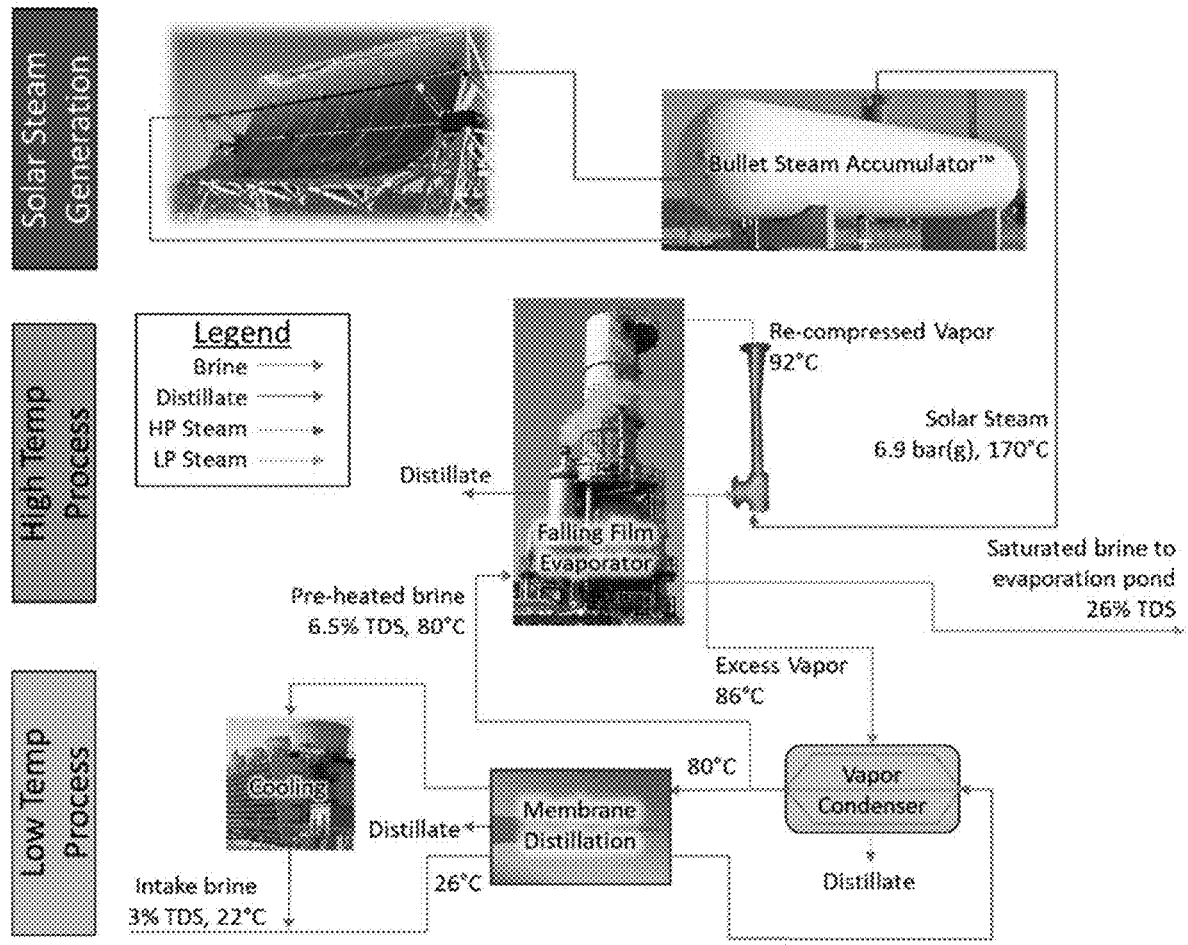
FIG. 6 is an example of one embodiments of the hybrid process/system.

The hybrid process described herein can overcome the disadvantages of conventional high recovery processes like MVR or limitations of solar thermal implementations utilizing TVR. As illustrated in FIG. 6, the exemplified hybrid process combine solar steam generation utilizing solar collector and steam accumulator, a high temperature process with falling film evaporator (FFE), and a low temperature process with thermal membrane distillation (MD).

The key components of the desalination side of the scalable exemplified hybrid process were priced for the 5 MW-scale commercial facility with estimated installed costs. The installed capital costs for equipment were utilized along with the levelized cost of heat (LCOH) for solar thermal process heat to develop final estimates of levelized cost of water (LCOW) for the exemplified hybrid process as well as for two reference cases: (1) a solar thermal vapor recompression system sized for the same overall solar thermal input power, and (2) a MVR system sized to match the nominal saturated brine rejection rate of the hybrid system, at ~835 m³/day of saturated brine. The results are shown in Table 1.

TABLE 1

Desalination Process LCOW Determination

| | SCEPTRE | Solar TVR | MVR | |
|---|---|---|---|---|
| | SM = 3<br>CUF = 62% | SM = 3<br>CUF = 62% | CUF = 95% | |
| | Yield | | | |
| GOR | 6.2 | 2.9 | N/A | |
| Permeate yield | 310,192 | 138,364 | 289,536 | m³/yr |
| Daily avg permeate flow | 850 | 379 | 793 | m³/day |
| | LCOW (heat is part of OPEX) | | | |
| Desalination CAPEX | $11,972,332 | $7,458,298 | $9,964,267 | |
| OPEX (heat for desal) | $ 852,778 | $ 852,778 | N/A | $/yr |
| OPEX (electricity for desal) | $ 28,476 | $ 23,323 | $1,100,238 | $/yr |
| OPEX (other desal) | $ 332,873 | $ 290,288 | $ 488,660 | $/yr |
| Total OPEX | $ 1,214,127 | $1,166,389 | $1,588,898 | $/yr |
| LCOW | $ 7.04 | $ 12.78 | $ 8.26 | $/m³ |

The exemplified hybrid process provides a significant (114%) increase in the GOR of the overall desalination process, boosting yield for the same solar steam consumption rate over the existing solar TVR process. The MVR capital expenditure (CAPEX) exceeds that of the hybrid process due to the presence of the compressor and the larger size of the capital-intensive FFE system needed to match the nominal concentrate output rate of the hybrid process, which benefits from the presence of the low-cost MD components to handle the initial brine concentrating at lower temperatures. Both of the solar processes use the same amount of heat as the primary annual operating expenditure (OPEX) input, and only small amounts of electricity for pumping, for a total energy-consumption OPEX of less than $883,000, while the MVR process requires $1,100,000 in grid electricity. Other OPEX for the hybrid process includes replacement membranes on a 4-year replacement schedule as well as other MD service, chemical use, and labor. The MVR process, with its larger FFE system and higher capacity factor, requires proportionally more service and maintenance expenses. The MVR pump is known to require high service and maintenance costs.

The resulting values of LCOW show clearly that utilizing the excess heat from the topping TVR system with MD provides a 45% reduction in LCOW compared to solar thermal desalination via topping-only TVR, to a level of $7.04/m³, representing not only a significant improvement for solar desalination, but also reaching commercial relevance by falling below the current state-of-the-art MVR LCOW of $8.3/m3.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A hybrid process for separating water from an inlet brine solution comprising:
   feeding the inlet brine solution into a first separation process thereby producing a first water distillate and a first concentrated brine solution;
   feeding the first concentrated brine solution into a second separation process thereby producing a second water distillate and a second concentrated brine solution; and
   wherein:
      the first separation process occurs at a lower temperature than the second separation process;
      the first separation process uses a semi-permeable membrane; and
      heat removed from the second separation process is provided to and consumed by the first separation process.

2. The hybrid process of claim 1, further comprising collecting the first water distillate and the second water distillate.

3. The hybrid process of claim 1, wherein the second concentrated brine solution has a higher concentration than the first concentrated brine solution, and the first concentrated brine solution has a higher concentration than the inlet brine solution.

4. The hybrid process of claim 1, further comprising a thermal energy source that provides a high temperature heat for the second separation process.

5. The hybrid process of claim 4, wherein the thermal energy source is solar thermal energy, geothermal energy, nuclear energy, exothermic chemical reaction, or a combination thereof.

6. The hybrid process of claim 1, wherein the first separation process comprises a process selected from the group consisting of membrane distillation, forward osmosis desalination, and enhanced-multi effect thermal separation.

7. The hybrid process of claim 6, wherein the first separation process comprises the membrane distillation.

8. The hybrid process of claim 7, wherein feeding the inlet brine solution into a first separation process comprises:
   feeding the inlet brine solution into a first circulating brine stream;
   heating the first circulation brine stream using the heat removed from the second separation process; and
   passing the first circulating brine stream through a hot side of the membrane distillation after the heating step.

9. The hybrid process of claim 8, further comprising passing the first circulating brine stream through a cool side of the membrane distillation.

10. The hybrid process of claim 8, further comprising passing the first water distillate through a cool side of the membrane distillation.

11. The hybrid process of claim 1, wherein the second separation process comprises a process selected from the group consisting of vertical falling film evaporation, forced circulation crystallization, multiple effect distillation, and multistage flash.

12. The hybrid process of claim 11, wherein the second separation process comprises the vertical falling film evaporation.

13. The hybrid process of claim 12, wherein feeding the first concentrated brine solution into the second separation process comprises:
   feeding the first concentrated brine solution into a second circulating brine stream; and
   heating the second circulation brine stream.

14. The hybrid process of claim 12, wherein the heat removed from the second separation process comprises water vapor.

15. The hybrid process of claim 1, further comprising feeding the second concentrated brine solution to a third separation process, thereby producing a third water distillate and a filtrate waste.

16. The hybrid process of claim 15, wherein the third separation process is a forced convection crystallizer.

17. The hybrid process of claim 15, wherein the third separation process occurs at a higher temperature than the temperature of the first separation process.

18. The hybrid process of claim 16, wherein the third separation process occurs at a higher temperature than the temperature of the first separation process.

19. The hybrid process of claim 15, wherein heat removed from the third separation process is supplied to and consumed by the first separation process.

* * * * *